(12) United States Patent
Sunay et al.

(10) Patent No.: US 9,942,819 B2
(45) Date of Patent: *Apr. 10, 2018

(54) SYSTEM AND METHOD FOR GROUP BASED HANDOVER PARAMETER OPTIMIZATION FOR WIRELESS RADIO ACCESS NETWORK LOAD BALANCING

(71) Applicant: NETSIA, INC., Sunnyvale, CA (US)

(72) Inventors: Mehmet Oguz Sunay, San Francisco, CA (US); Ali Ozer Ercan, San Jose, CA (US)

(73) Assignee: NETSIA, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/592,167

(22) Filed: May 10, 2017

(65) Prior Publication Data

US 2017/0332303 A1    Nov. 16, 2017

Related U.S. Application Data

(60) Provisional application No. 62/334,397, filed on May 10, 2016.

(51) Int. Cl.
*H04W 36/22* (2009.01)
*H04W 36/00* (2009.01)
(Continued)

(52) U.S. Cl.
CPC ............. *H04W 36/22* (2013.01); *H04W 8/22* (2013.01); *H04W 36/0072* (2013.01);
(Continued)

(58) Field of Classification Search
CPC ... H04W 36/22; H04W 8/22; H04W 36/0072; H04W 36/0088; H04W 36/0094; H04W 36/245; H04W 84/18
See application file for complete search history.

(56) References Cited

U.S. PATENT DOCUMENTS 8,428,610 B2    4/2013  Chowdhury et al.
8,738,004 B2    5/2014  Amirijoo et al.
(Continued)

FOREIGN PATENT DOCUMENTS

WO    2013072271    5/2013

OTHER PUBLICATIONS

"Evolved Universal Terrestrial Radio Access (E-UTRA); Radio Resource Control (RRC); Protocol specification," Technical Specification TS36.331, ver.10.7.0, Release 10, Nov. 2012, 307pgs.
(Continued)

*Primary Examiner* — Dinh P Nguyen
(74) *Attorney, Agent, or Firm* — IP Authority, LLC; Ramraj Soundararajan

(57) ABSTRACT

A hand over (HO) parameter optimization module includes: (a) an interpolator that receives a measurement report comprising: (1) signal strength or signal quality values as measured by an user equipment (UE), (2) performance indicator values as measured by the UE, and (3) load values associated with at least one base station that serves the UE, identifying one or more time instances that lack signal strength, signal quality, performance indicator, or load values, and interpolating values for the identified one or more time instances; (b) storage that stores the received measurement report and interpolated values; and (c) an optimizer that optimizes one or more HO parameters per group based on stored measurement reports and interpolated values.

20 Claims, 9 Drawing Sheets

(51) Int. Cl.
*H04W 8/22* (2009.01)
*H04W 36/24* (2009.01)
*H04W 84/18* (2009.01)

(52) U.S. Cl.
CPC ... *H04W 36/0088* (2013.01); *H04W 36/0094* (2013.01); *H04W 36/245* (2013.01); *H04W 84/18* (2013.01)

(56) References Cited

U.S. PATENT DOCUMENTS

| | | |
|---|---|---|
| 8,954,071 B2 | 2/2015 | Klatt et al. |
| 8,995,262 B2 | 3/2015 | Chowdhury et al. |
| 9,055,501 B2 | 6/2015 | Ekemark |
| 2004/0147267 A1* | 7/2004 | Hill ............... H04W 64/00 455/441 |
| 2009/0163223 A1 | 6/2009 | Casey |
| 2011/0176424 A1 | 7/2011 | Yang et al. |
| 2011/0274094 A1* | 11/2011 | Jovicic ............ G01S 5/0252 370/338 |
| 2013/0003548 A1 | 1/2013 | Sridhar et al. |
| 2014/0004862 A1 | 1/2014 | Ekemark |
| 2015/0031360 A1 | 1/2015 | Choi et al. |
| 2015/0189533 A1 | 7/2015 | Fehske et al. |
| 2016/0360462 A1* | 12/2016 | Chockalingam ...... H04W 36/30 |

OTHER PUBLICATIONS

Evolved Universal Terrestrial Radio Access Network (E-UTRAN); Self-configuring and self-optimizing network (SON) use cases solutions, Technical Report TR36.902, ver 9.3.1, Release 9, May 2011, 23pgs.

"Evolved Universal Terrestrial Radio Access (E-UTRAN); User Equipment (UE) procedures in idle mode," Technical Specification TS136.304, ver 8.3.0, Release 8, Nov. 2008, 30 pgs.

Lateef et al., "LTE-Advanced Self-Organising Network Conflicts and Coordination Algorithms," IEEE Wireless Communications, 22(3), Jun. 2015, pp. 108-117.

* cited by examiner

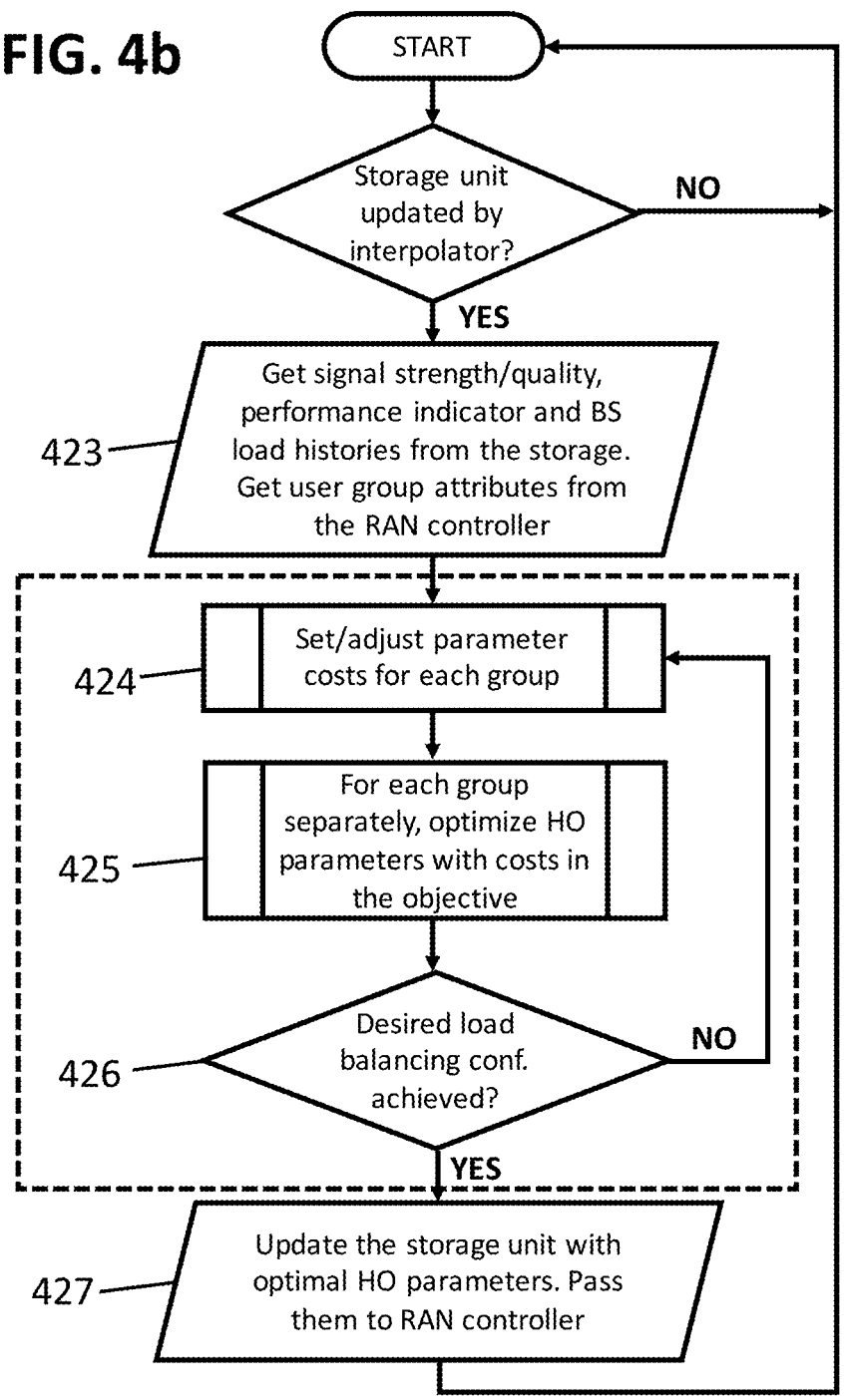

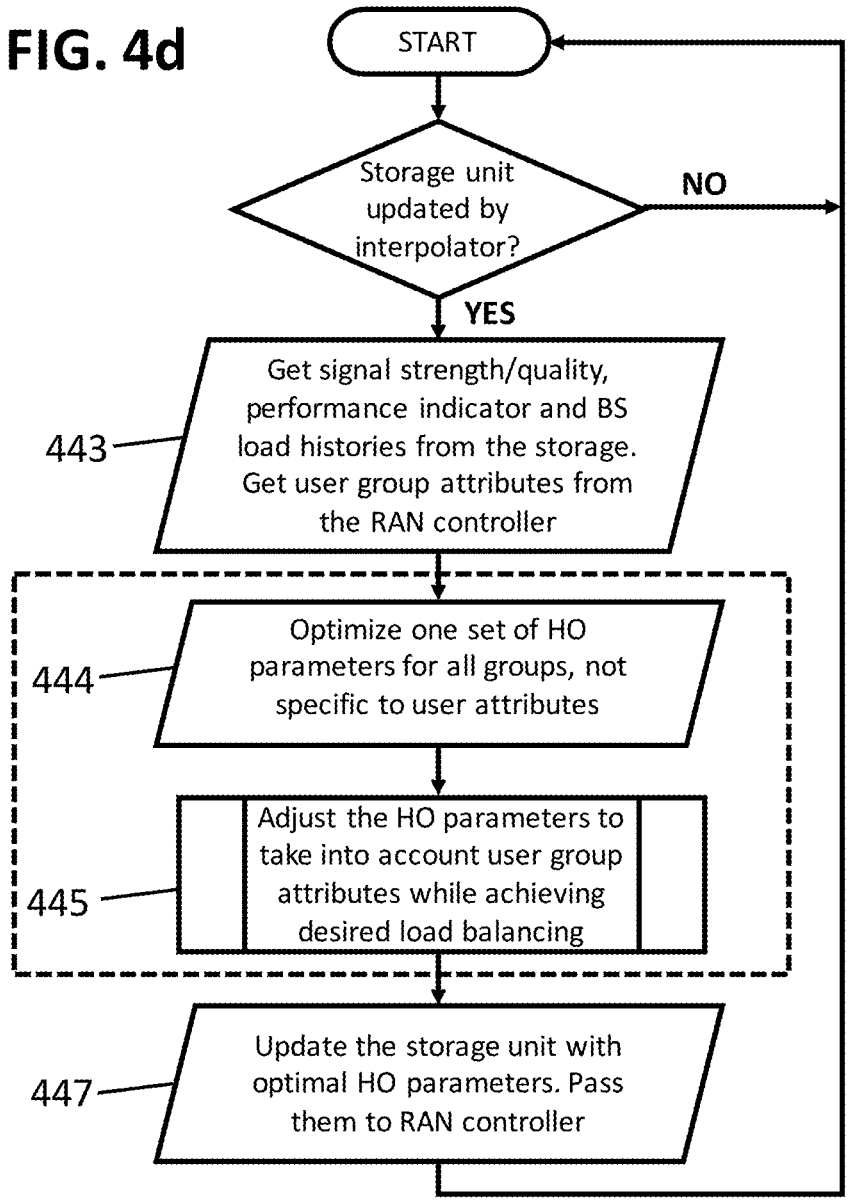

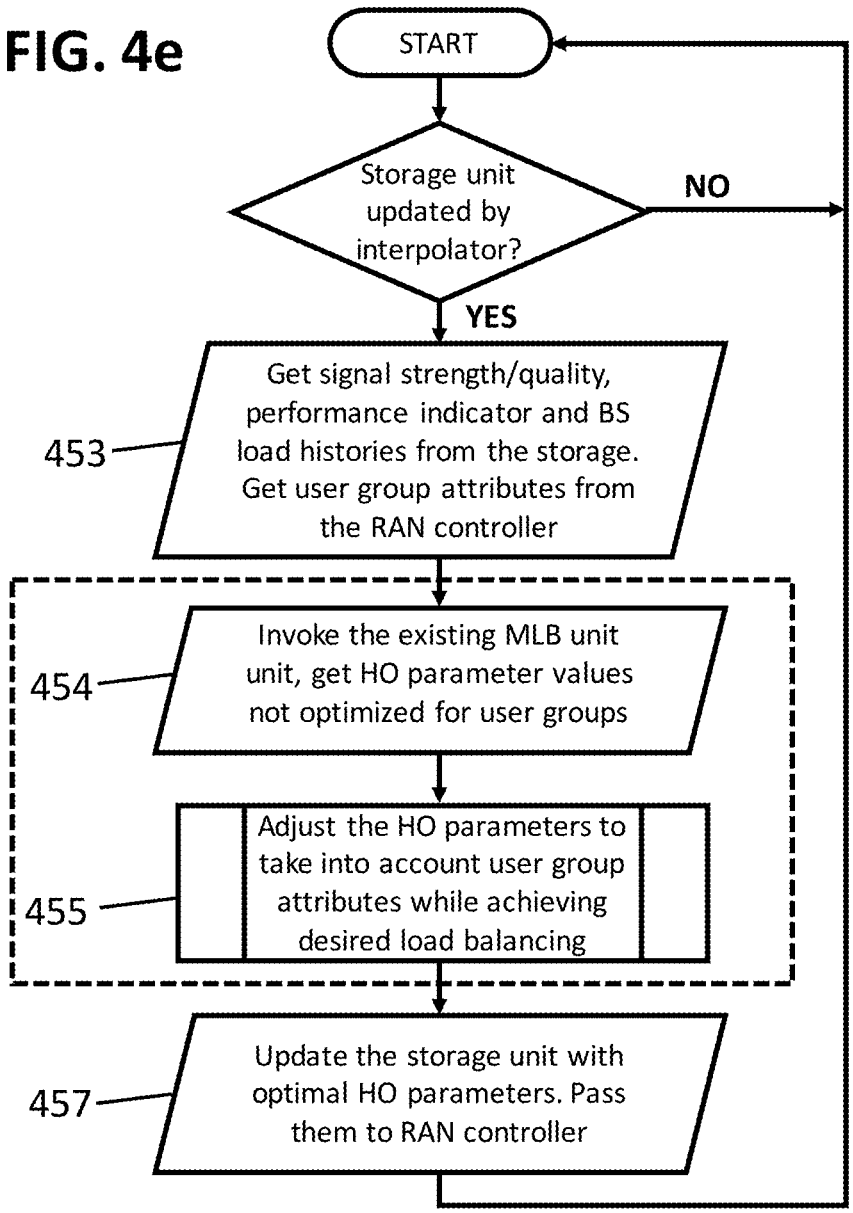

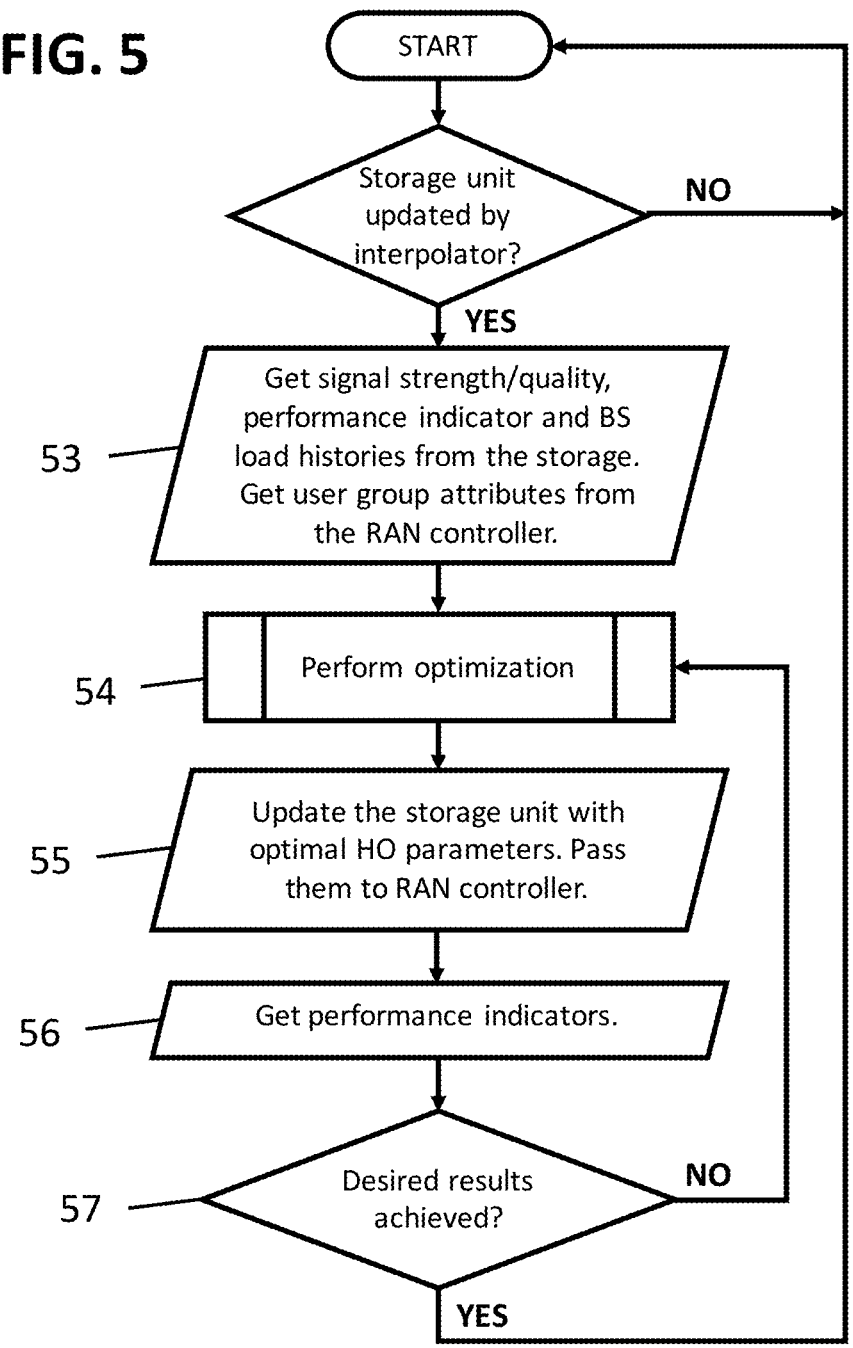

SYSTEM AND METHOD FOR GROUP BASED HANDOVER PARAMETER OPTIMIZATION FOR WIRELESS RADIO ACCESS NETWORK LOAD BALANCING

RELATED APPLICATIONS

This application claims the benefit of provisional application 62/334,397 filed May 10, 2016.

BACKGROUND OF THE INVENTION

Field of Invention

The present application pertains to group-based programmable optimization of the mobility load balancing function of self-organizing network (SON) solution in wireless broadband communication systems.

Discussion of Related Art

The patent publication US 2015/0031360 A1 presents method and device for Mobility Load Balancing (MLB) in a wireless communication system, using statistical information obtained from the base stations, in order not to deteriorate handover success rate. The loads of at least one cell managed by the base station and at least one neighboring cell are measured. At least one candidate and one target cells are selected to perform MLB application. The selection is based on the absolute difference between the base station loads or based on the ratio of their loads. At least one user equipment (UE) is selected for cell individual offset (CIO) parameter change. The method further includes mobility robustness optimization (MRO) functionality's information by removing some base stations from the candidate set of targets based on this information.

The patent publication US 2015/0189533 A1 presents a method for the joint optimization of MLB and coverage and capacity optimization (CCO). Using the received power from the UEs as feedback, optimal partitioning of the served area and optimal BS loads are found jointly. Several metrics such as received power, SINR, etc., for computing coverage and BS load are specified. BS physical parameters and CIO parameters are jointly optimized by iterative direct search.

The patents U.S. Pat. No. 8,428,610 B2 and U.S. Pat. No. 8,995,262 B2 both disclose method and systems for providing a load factor for load balancing in a communication network. The load factor is aimed to be used in determining the load distribution of network elements, determining the need for load balancing and finding the candidate elements to hand-off the load to, and determining how the load is balanced between network elements. The load factor depends on the load conditions, mainly of the MME, which includes information on at least one of processing unit usage, memory usage, number of active sessions and memory in operative communication with the processing unit. MME function periodically monitors and stores the load conditions in real time and notifies the eNodeBs and other network elements whenever conditions change.

The patent U.S. Pat. No. 8,738,004 B2 discloses a method and apparatus for excluding the statistics of handover and radio link failures due to non-mobility handover events, such as due to load balancing, cell maintenance, cell outage, etc., in the MRO functionality. The key performance indicators (KPI) related to mobility are also computed with excluding the statistics due to non-mobility handover events. The patent proposes a non-mobility causation filter to determine handover issues due to non-mobility events. This way, only handover events that are not related to non-mobility events are fed into the MRO.

The patent publication US 2014/0004862 A1 and the patent U.S. Pat. No. 9,055,501 B2 both disclose a method and node supporting cell reselection in load balanced network. The aim is to reduce inter-frequency cell reselections when UEs go between connected and idle modes. When there are overlapping cells served with different frequencies, for each cell, their own frequency is broadcasted to have higher priority. This way when UEs perform cell reselection, they are more likely to reselect their former frequency. Thus, less inter-frequency handover signaling overhead is incurred.

The patent publication US 2013/0003548 A1 provides a method for improved load balancing in communication networks. The aim is to consider the backhaul capacity as well in load balancing. In one method, the packet loss for traffic between first network node and second network node is used to determine load balancing necessity. Network nodes may be eNodeB, Packet Gateway (PGW), Serving Gateway (SGW), etc. Packet loss may be Ethernet frame loss, just the packet loss for high priority traffic, etc. In another method, the loading level due to traffic between a network node and the mobile devices served by this node is used as a metric.

The patent publication US 2011/0176424 A1 discloses a method to take into account UE and/or network capabilities when building mapping tables for networks, to be used in cell reselection. Furthermore, the mapping table is based on the operator policy and network deployment conditions. A priority list is obtained by looking up the mapping table with the subscriber profile identification and UE capability. The mapping table is preferably updated for load balancing.

The patent U.S. Pat. No. 8,954,071 B2 discloses a method where subscription related information of each user is utilized in any mobility or radio resource management related procedure/decisions, both in idle and active mode. Subscriber type points to locally stored handling rules to be applied in the RAN. The rules are defined in eNB by means of configuration files.

The patent publication US 2009/0163223 A1 discloses a method for load balancing in mobile networks. Different load balancing variables, such as thresholds, etc., are provided for different traffic types, such that delay sensitive traffic avoids unnecessary handovers while delay insensitive traffic might be handed over for load balancing. Load balancing is first triggered for low priority traffic The patent EP 2781123 A1 discloses methods, apparatus and computer programs for performing MRO and MLB for only a subset of user equipment. The users served by a cell access node is partitioned into at least two groups according to at least one partitioning criterion, and MLB operations are performed between two access nodes of the network considering only one group of users identified by a group indicator information, which is sent to the neighboring cell via a message. Partitioning criterion may be based on QoS criterion or UE capability. QoS criterion may be based on if UE has any real-time radio bearers or only non-real-time. QoS may also be based on QoS Class Identifier (QCI). Furthermore, messages in MRO root cause analysis are extended with group identification information. As such, Key Performance Indicators (KPIs) can be computed separately with respect to group indicator information.

Embodiments of the present invention are an improvement over prior art systems and methods.

SUMMARY OF THE INVENTION

In one embodiment, the present invention provides a hand over (HO) parameter optimization module implementing mobility load balancing (MLB) by communicating with a radio access network (RAN) controller, the HO parameter optimization module comprising: (a) an interpolator: receiving associated with at least a base station serving the user equipment (UE) and at least one other base station in the neighborhood of the UE a measurement report comprising: (1) signal strength or signal quality values as measured by an user equipment (UE), (2) other performance indicator values as measured by the UE, and (3) load values reported by the base stations, identifying one or more time instances that lack measurements of signal strength, signal quality, performance indicator, or load values, and interpolating values for the identified one or more time instances; (b) storage storing the received measurement report and interpolated measurement values; and (c) an optimizer optimizing one or more HO parameters per user group based on stored measurement reports and interpolated measurement values, wherein a user group is a grouping of UEs.

In another embodiment, the present invention provides a method as implemented in a hand over (HO) parameter optimization module implementing mobility load balancing (MLB) by communicating with a radio access network (RAN) controller, the method comprising: (a) receiving, associated with at least a base station serving the user equipment (UE) and at least one other base station in the neighborhood of the UE via an interpolator, a measurement report comprising: (1) signal strength or signal quality values as measured by an user equipment (UE), (2) other performance indicator values as measured by the UE, and (3) load values reported by the base stations; (b) identifying one or more time instances that lack measurements of signal strength, signal quality, performance indicator, or load values; (c) interpolating values for the identified one or more time instances; (d) storing, within a storage, the received measurement report and interpolated measurement values; and (e) optimizing, via an optimizer, one or more HO parameters per user group based on stored measurement reports and interpolated measurement values, wherein a user group is a grouping of UEs.

In yet another embodiment, the present invention provides an article of manufacture comprising non-transitory computer storage medium storing computer readable program code which, when executed by a processor in a single node, implements a hand over (HO) parameter optimization module implementing mobility load balancing (MLB) by communicating with a radio access network (RAN) controller, the medium comprising: (a) computer readable program code executed by the processor to implement an interpolator: receiving associated with at least a base station serving the user equipment (UE) and at least one other base station in the neighborhood of the UE a measurement report comprising: (1) signal strength or signal quality values as measured by an user equipment (UE), (2) other performance indicator values as measured by the UE, and (3) load values associated with reported by the base stations, identifying one or more time instances that lack measurements of signal strength, signal quality, performance indicator, or load values, and interpolating values for the identified one or more time instances; (b) computer readable program code executed by the processor to store, in a storage, the received measurement report and interpolated measurement values; and (c) computer readable program code executed by the processor to implement an optimizer optimizing one or more HO parameters per user group based on stored measurement reports and interpolated measurement values, wherein a user group is a grouping of UEs.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIGS. 4A-4E show different embodiments of the operations of the optimizer module. FIG. 4A describes an embodiment where the HO parameters of all user groups are optimized jointly. FIG. 4B describes an embodiment where the HO parameters for different groups are optimized separately. Parameter costs that are associated with each user group and that are used in individual optimizations are also optimized in an iterative fashion to achieve a jointly optimal result. FIG. 4C describes an embodiment where the HO parameters are optimized separately. Parameter ranges that are associated with each user group and that are used in individual optimizations are also optimized in an iterative fashion to achieve a jointly optimal result. FIG. 4D describes an embodiment where a common set of HO parameters for all user groups are first optimized and then adjusted for individual groups to take into account the user group attributes. FIG. 4E describes an embodiment where a common set of HO parameters for all user groups are first obtained by invoking an existing MLB functionality and then adjusted for individual groups to take into account the user group attributes.

FIG. 5 depicts a preferred embodiment where the HO parameters are optimized incrementally and iteratively, while observed key performance indicators are used as feedback to steer incremental optimizations to a desired outcome.

DESCRIPTION OF THE PREFERRED EMBODIMENTS

Figure 1:
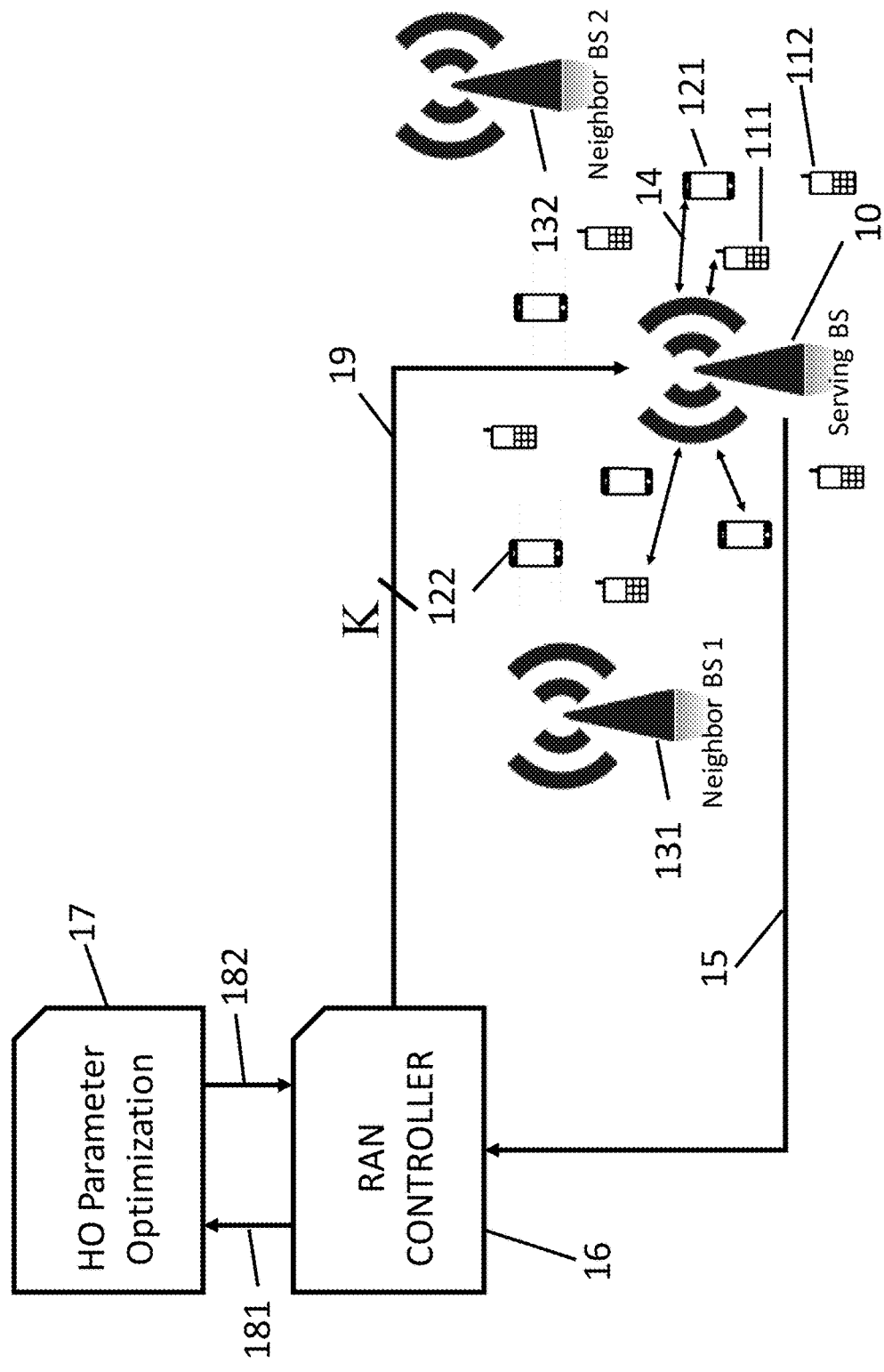
FIG. 1 illustrates the architecture of the proposed invention. A plurality of user equipment (UEs) is connected to a serving station. There may exist several service groups and the said UEs may belong to one or more of the service groups. The UEs report measured signal strengths/qualities, and key performance indicators such as the radio link failure rate, and report these to the RAN controller as explained in the 3GPP standards. Future standards are expected to have equivalent parameters, and these are reported when these standards are used. Using the history of these reports, history of base station loads, as well as history of previous optimization results, the HO Parameter Optimization module optimizes a set of handover (HO) parameters per user group, taking into account the user group attributes. Then these are instructed to the UEs via the serving base station.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

With the recent trends in mobile networks, such as growing data rates, increasing heterogeneity in services, etc., the operational costs have also exhibited similarly increasing trends. In order to compete with this, self-organizing networks (SON) concept have recently begun to find its place in modern telecommunication systems, such as LTE. SON functionality aims to automate many management tasks within the network, minimize human intervention, dynamically self-optimize operational parameters and automatically recover from failures. As such, not only operational costs are reduced, but also human errors are minimized and network resources are used more efficiently.

One such SON functionality is Mobility Load Balancing (MLB) that automatically optimizes handover parameters for load balancing between the base stations of the radio access network, without significantly impacting the radio link failure or handover failure rates. This invention is concerned with specification of a system and method where there may be multiple service groups that user equipment may belong to, and where a set of handover parameters are optimized for each said user group jointly with the other user groups taking into account the user group attributes, with the goal of load balancing without significantly impacting the radio link failure or handover failure rates.

The network operator or service provider that serves a plurality of subscribers defines a service group for said plurality of subscribers and controls the corresponding handover parameters for the said service group. The grouping of users or flows of users into service groups may be in one or more of the following ways:

In an environment where one mobile network operator (MNO) and one of more mobile virtual network operators (MVNOs) utilize the same spectrum, users may be grouped according to their network operator subscriptions, Users may be grouped according to their service subscription profiles, Users may be grouped according to their geography and time specific radio resource reservation requests, Flows of users may be grouped according to flow profiles where a flow profile includes but is not limited to the following: flow type, flow header contents, over-the-top service provider identity.

The handover parameters in an LTE network are associated with the event A3, which is described in the measurement reporting section of 3GPP TS 36.331. Event A3 gets triggered if a neighbor cell's received signal strength becomes better than the serving cell by some specified offset parameters, and stays that way for a specified amount of time. When triggered, the UE sends a signal to the serving BS and the serving BS may respond with handover commands. Specifically, the event A3 gets triggered if $$M_s+O_{A3}+O_{fs}+O_{cs}+H<M_n+O_{fn}+O_{cn}, \quad (1)$$

where, $M_s$ and $M_n$ denote the measured RSRPs, $O_{fs}$ and $O_{fn}$ denote the frequency specific offsets (offsetFreq parameter in measObjectEUTRA), $O_{cs}$ and $O_{cn}$ denote the cell specific offsets (cellIndividualOffset parameter in measObjectEUTRA), H is a hysteresis parameter (hysteresis parameter in reportConfigEUTRA), and $O_{A3}$ is the offset parameter for the A3 event (a3-offset parameter in reportConfigEUTRA). Above, the subscripts s and n denote "serving cell" and "neighbor cell", respectively, for each of the defined parameters. In addition to the parameters above, the "time-to-trigger" (TTT) parameter is defined as the duration that condition in Equation (1) must be satisfied contiguously for triggering event A3. The leaving condition of the A3 event is given by $$M_s+O_{A3}+O_{fs}+O_{cs}-H>M_n+O_{fn}+O_{cn}, \quad (2)$$

Note the change of polarity of the hysteresis parameter. In the upcoming standards such as 5G, equivalent events, measurements and handover parameter definitions will be present. The invention is concerned in the optimization of the afore-mentioned handover parameters in an LTE network, or equivalent parameters related to handover in any standard.

This invention is concerned with the specification of system and methods for the joint optimization of a set of handover parameters for each user group, that takes into account the user group attributes such as priority, traffic type, equipment capability, etc., while desired load balancing is achieved without impacting key performance indicators, such as handover or radio link failure rates.

This invention enables formation of user groups based on a set of attributes, which allows a richer and more flexible way of categorizing the UEs rather than partitioning. For example, according to the invention, a UE may belong to more than one user group, or a user may belong to different groups at different times or locations. The system and methods described in the invention allow optimization of handover parameters of all user groups individually and jointly, such that a joint global optimum can be reached in terms of utilizing the system resources efficiently, realizing the desired load balancing without impacting the system performance while individual needs of users groups can be accommodated and/or priorities can be enforced.

The architecture proposed by the invention is depicted in FIG. 1. In the figure, plurality of user equipment (UE) such as (111), (112), (121), (122) are connected to a serving base station (10). There may exist different user groups, as defined above, that the said UEs belong to. In the figure, as an example, two user groups are depicted by using different icons for the UEs, such that the UEs (111) and (112) belong to one user group and (121) and (122) belong to another user group. It may also be the case that a UE may belong to more than one user group, or a UE may belong to different user groups at different times or locations.

All UEs periodically measure received signal strengths/qualities from all base stations, that is, from serving (10) and neighbor base stations (131), (132), and construct signal strength/quality indicators such as the RSRP and RSRQ values as defined in the 3GPP standards. Then using the criterions as defined in the 3GPP standards and as summarized above, when the A3 event triggers, these measurement results are reported to the serving base station (14). The invention is not limited to the A3 event and the measurements and handover parameters defined therein. Any future standards are expected to have equivalent handover events and equivalent measurements and parameters associated with such handover events. For those standards, when such equivalent events trigger, said equivalent measurements are reported (14).

According to the invention, these reports are first sent (15) to the RAN controller (16). The RAN controller forwards this information (181) to the Handover (HO) Parameter Optimization Module (17) proposed by this invention. Additionally, base station loads, in terms of number of UEs served, total computational, energy, memory, wireless resource usage levels of the base station, etc., are also made available (181) to the HO Parameter Optimization Module. This module produces optimized HO parameter sets, either as defined in the 3GPP standards consisting of the offset parameters, hysteresis parameter and time to trigger parameter defined therein, or equivalent parameters of future standards. One optimal set of parameters per group is produced. In the figure, conceptually K groups are assumed to exist, therefore K sets of parameters are produced. Then this information is sent back (182) to the RAN controller. The RAN controller then updates the UEs with their associated group's HO parameters (19) via the serving base station. If a UE is associated with more than one user group, then the RAN controller may decide which set of HO parameters to be sent to that UE.

When the RAN controller receives measurement reports, it may instruct some UEs to perform handovers. The effect of such instructions is reported back to the RAN controller (15) in the form of radio link failures and other key performance indicators as defined in the 3GPP standards, or by equivalent feedback mechanisms of future standards. This information is also made available (181) to the HO Parameter Optimization module. Additionally, the user group attributes such as priority, traffic type, equipment capability, etc., are also made available (181) to the HO Parameter Optimization module by the RAN controller.

The goal of MLB is to perform load balancing with the minimum possible impact on the performance indicators. Additionally, under the model of this invention, each user group's attributes such as priority, traffic type, equipment capability, etc. should be taken into account and an optimal set of HO parameter set for each user group should be computed, while achieving the said load balancing and minimum impact goals. These goals and constraints couples the optimization of the HO parameters of all groups. Therefore, there is a need to optimize these parameters jointly. It is the HO Parameter Optimization Module's task to achieve this goal.

In addition to the user group attributes, the input parameters to be considered in the optimization are the history of base station loads, history of measured signal qualities such as the RSRP and RSRQ values of each UE to their serving base stations, the history of measured signal qualities such as the RSRP and RSRQ values of each UE to their neighboring base stations, the history of observed handover or link failure rates for each UE, the history of other key performance indicators reported by the UEs, the history of used HO parameters. When some of these parameters are not available due to lack of reports from some UEs at some time instants, these values will be interpolated by the HO Parameter Optimization module from the known values. The output parameters are one set of optimized handover parameter values per each group.

Figure 2:
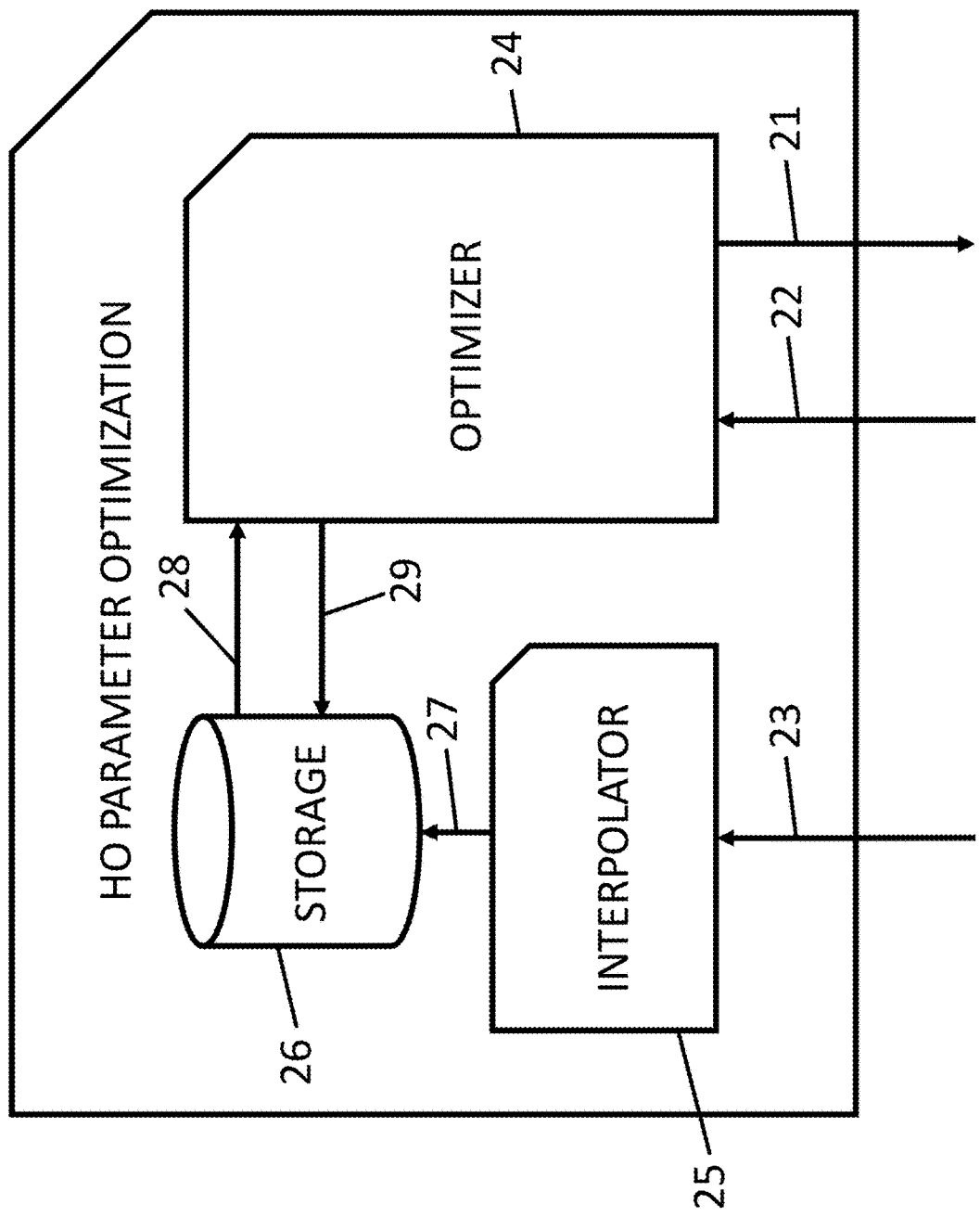
FIG. 2 illustrates the architecture of the proposed HO parameter optimization module. The unknown signal strength/quality and performance indicator values, due to lack of reports at some time instants, are first interpolated for each UE from known values. Then, full history of these parameters is stored in a storage unit, such as a database. Similarly reported base station loads are also interpolated and stored. The results of previous HO parameter optimization operations are also stored in the storage. The optimizer uses all information stored in the storage module to optimize for the HO parameters.

The architecture of the proposed HO parameter optimization module is given in FIG. 2. The measurement reports and performance indicators from the UEs, and the base station (BS) loads are first passed (23) from the RAN controller to the interpolator module (25). The interpolator's duty is to construct a history of such parameters for all UEs and all BSs. Said parameters may be not reported at all time instants. The interpolator interpolates the values of such time instants from the known values. Then complete histories of the measured signal strengths/qualities, performance indicators, and loads are passed (27) to a storage unit (26) such as a database. The optimizer module (24) accesses the history of said parameters from the storage unit (28) and service group attributes from the RAN controller (22) and performs the optimization of HO parameters for each service group. The optimized HO parameters are then sent back (21) to the RAN controller. The optimized HO parameters are also stored in the storage unit (29) to be used in future optimizations.

Figure 3:
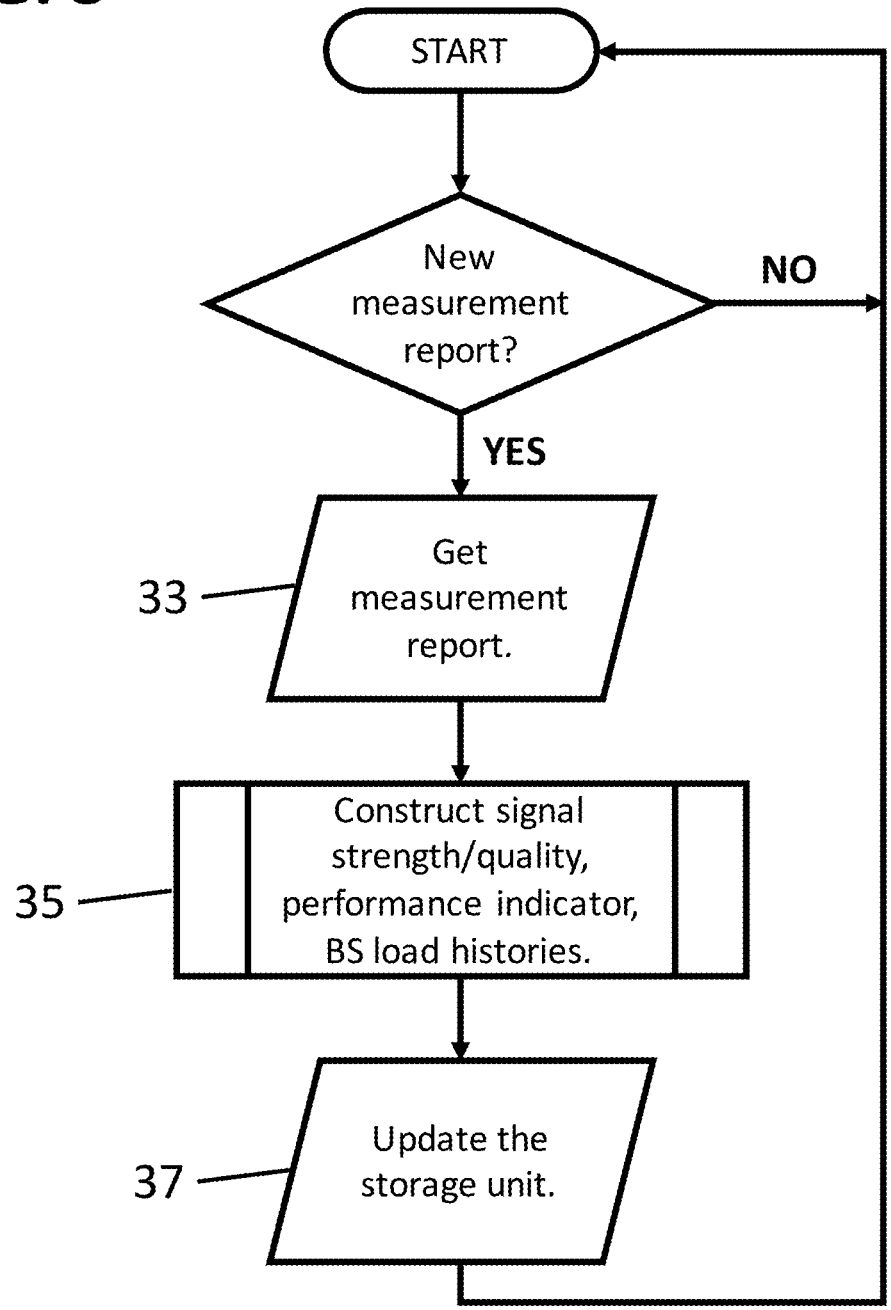
FIG. 3 depicts the operations of the interpolator module.

The operation of the interpolator module (25) is given in FIG. 3. Whenever a new measurement for a UE or a BS arrives, the interpolator first acquires this report from the RAN controller (33). Then according to the time stamp of the report and the sampling interval adopted for the parameter histories, it interpolates the missing values to construct the signal strength/quality, performance indicator or BS load histories (35). Then the new information is incorporated into the storage element (37).

Figure 4A:
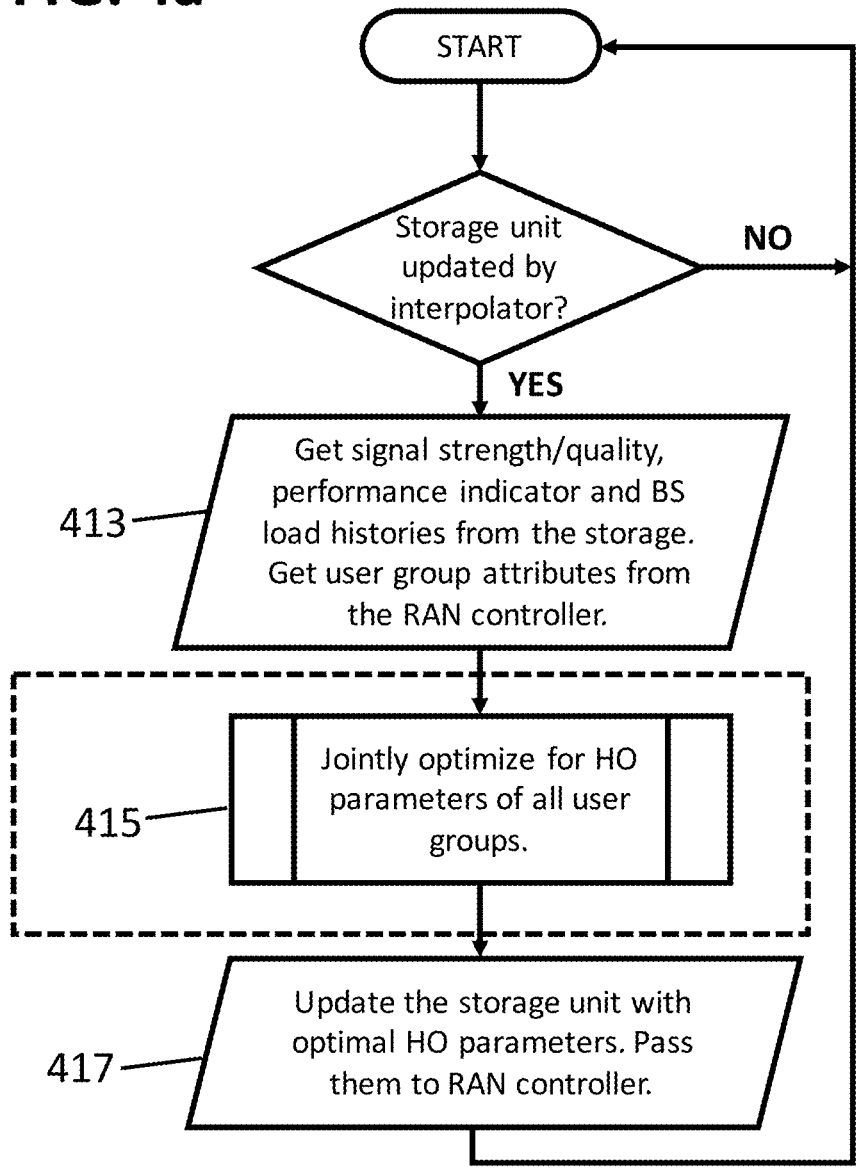

One embodiment of the HO parameter optimization module's operations is given in FIG. 4A. Whenever the parameters are updated by the interpolator, a signal is sent via the connection (28) to the optimizer module. The optimizer module then gets the signal strength/quality, performance indicator and BS load histories from the storage unit, and the user group attributes from the RAN controller (413). Then the optimizer module jointly optimizes for the HO parameters of all user groups (415). Then the optimized parameters are both stored in the storage unit with time stamp and sent to the RAN controller (417). In another embodiment, the HO parameter optimization module may additionally use these stored optimal HO parameters in the optimization.

In another embodiment, as shown in FIG. 4B, the HO parameters of each group are optimized separately. Whenever the parameters are updated by the interpolator, a signal is sent via the connection (28) to the optimizer module. The optimizer module then gets the signal strength/quality, performance indicator and BS load histories from the storage unit, and the user group attributes from the RAN controller (423). In order to enforce the optimized parameter values to take into account the user group attributes, parameter costs are determined per group (424). For example, a low priority group might have a higher cost of increasing the cell individual offset parameter compared to a higher priority group. The optimization module optimizes for the HO parameters, while taking these costs into account (425). Since each group's parameters are optimized separately, a desired configuration that is projected to achieve the desired load balancing might have not resulted. If this is the case (426), in order to enforce load balancing, the optimized HO parameter values are used as feedback and costs are updated (424), and optimization is performed with the new costs (425). This is repeated until desired load balancing is achieved and final optimized parameters are both stored in the storage unit with time stamp and sent to the RAN controller (427).

Figure 4C:
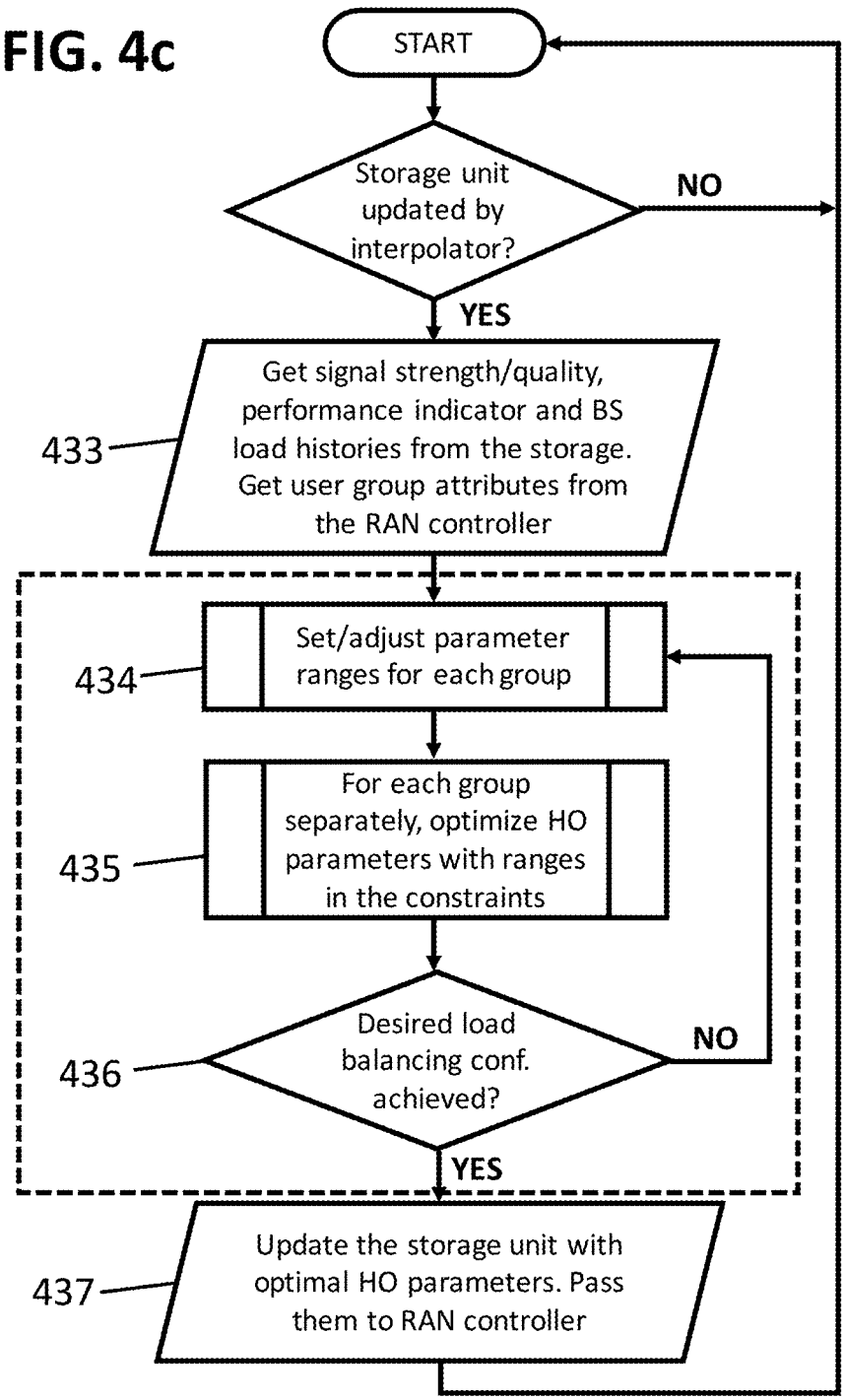

In another embodiment, which is shown in FIG. 4C, the HO parameters of each group are optimized separately. Whenever the parameters are updated by the interpolator, a signal is sent via the connection (28) to the optimizer module. The optimizer module gets the signal strength/quality, performance indicator and BS load histories from the storage unit, and the user group attributes from the RAN controller (433). In order to enforce the optimized parameter values to take into account the user group attributes, allowed ranges for the HO parameters are determined per group (434). For example, a low priority group might be allowed a lower range of values for the cell individual offset parameter compared to a higher priority group. The optimization module optimizes for the HO parameters, while taking these allowed ranges into account in the optimization constraints (435). Since each group's parameters are optimized separately, a desired configuration that is projected to achieve the desired load balancing might have not resulted. If this is the case (436), in order to enforce load balancing, the optimized HO parameter values are used as feedback and parameter ranges are updated (434) and optimization is performed with the new ranges (435). This is repeated until desired load balancing is achieved and final optimized parameters are both stored in the storage unit with time stamp and sent to the RAN controller (437).

In another embodiment, which is shown in FIG. 4D, only one set of HO parameters are first optimized generally for all groups (444) and then these parameters are adjusted to generate one set of parameters per user group (445), taking into account the user group attributes. The adjustments, for example, may be in the nature of multiplying the HO parameters with user group-specific weights. The invention is not limited to this type of adjustment, however.

In another embodiment, which is shown in FIG. 4E, one set of HO parameters are optimized by invoking the existing MLB unit (454) in the SON module and then these parameters are adjusted to generate one set of parameters per user group (455), taking into account the user group attributes.

In a preferred embodiment, all of the optimizations given in FIGS. 4A-4E are done in an incremental fashion. This is shown in FIG. 5. The block called "Perform optimization" (54) corresponds to the block (415) in FIG. 4A, blocks (424), (425) and (426) in FIG. 4B, blocks (434), (435) and (436) in FIG. 4C, blocks (444) and (445) in FIG. 4D, and blocks (454) and (455) in FIG. 4E. These blocks are also encapsulated with dotted lines in the corresponding figures in order to highlight them. After the optimization is performed in any of the ways explained in the embodiments given above and shown in FIGS. 4A-4E, the optimized parameters are stored in the storage unit with time stamp and sent to the RAN controller (55). When the UEs report back the performance indicators related to the actions taken due to the optimized HO parameters, these are updated in the storage module by the interpolator module. These values are acquired (56) and the performance of the previously set HO parameters is judged (57). If satisfactory results are not achieved, the optimization is repeated. The optimization step in this preferred embodiment is incremental in nature, taking into account the previously used HO parameters as initial points and making only incremental changes to them. This incremental update procedure is repeated until desired results are achieved.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a system and method for group based handover parameter optimization for wireless radio access network load balancing. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A hand over (HO) parameter optimization module implementing mobility load balancing (MLB) by communicating with a radio access network (RAN) controller, the HO parameter optimization module comprising:
   (a) an interpolator:
   receiving associated with at least a base station serving the user equipment (UE) and at least one other base station in the neighborhood of the UE a measurement report comprising: (1) signal strength or signal quality values as measured by an user equipment (UE), (2) other performance indicator values as measured by the UE, and (3) load values reported by the base stations,
   identifying one or more time instances that lack measurements of signal strength, signal quality, performance indicator, or load values, and
   interpolating values for the identified one or more time instances;
   (b) storage storing the received measurement report and interpolated measurement values; and
   (c) an optimizer optimizing one or more HO parameters per user group based on stored measurement reports and interpolated measurement values, wherein a user group is a grouping of UEs.

2. The HO parameter optimization module of claim 1, wherein the load values of a base station are any of, or a combination of, the following: total number of UEs served, total computational power, total computational memory, and the wireless resource usage levels of that base station.

3. The HO parameter optimization module of claim 1, wherein the optimizer additionally takes into account each user group's attributes as part of optimizing one or more HO parameters, each group's attributes comprising any of, or a combination of, the following: priority, traffic type, and equipment capability.

4. The HO parameter optimization module of claim 1, wherein the optimizer additionally takes into account: a history of base station loads, a history of measured signal qualities, a history of measured signal qualities, a history of observed handover or link failure rates for each UE, a history of other key performance indicators reported by UEs, and a history of used HO parameters.

5. The HO parameter optimization module of claim 4, wherein the history of measured signal qualities comprises Reference Signal Received Power (RSRP) and Reference Signal Received Quality (RSRQ) values of each UE with respect to their serving base station.

6. The HO parameter optimization module of claim 1, wherein the one or more HO parameters of all user groups served by the base station are optimized jointly.

7. The HO parameter optimization module of claim 1, wherein the one or more HO parameters of each group served by the base station is optimized separately.

8. The HO parameter optimization module of claim 1, wherein only one set of HO parameters are first optimized generally for all groups and, subsequently, adjusting the one set of HO parameters to generate another set of parameters for a given user group, taking into account attributes associated with that given user group.

9. The HO parameter optimization module of claim 1, wherein one set of HO parameters are optimized by invoking an existing MLB unit of a self-organizing network (SON) module and, subsequently, adjusting the one set of HO parameters to generate another set of parameters for a given user group, taking into account attributes associated with that given user group.

10. The HO parameter optimization module of claim 1, wherein the UE belongs to any of the following: a single user group, more than one user group, o different user groups at different times.

11. A method as implemented in a hand over (HO) parameter optimization module implementing mobility load balancing (MLB) by communicating with a radio access network (RAN) controller, the method comprising:
(a) receiving, associated with at least a base station serving the user equipment (UE) and at least one other base station in the neighborhood of the UE via an interpolator, a measurement report comprising: (1) signal strength or signal quality values as measured by an user equipment (UE), (2) other performance indicator values as measured by the UE, and (3) load values reported by the base stations;
(b) identifying one or more time instances that lack measurements of signal strength, signal quality, performance indicator, or load values;
(c) interpolating values for the identified one or more time instances;
(d) storing, within a storage, the received measurement report and interpolated measurement values; and
(e) optimizing, via an optimizer, one or more HO parameters per user group based on stored measurement reports and interpolated measurement values, wherein a user group is a grouping of UEs.

12. The method of claim 11, wherein the load values of a base station are any of, or a combination of, the following: total number of UEs served, total computational power, total computational memory, and the wireless resource usage levels of that base station.

13. The method of claim 11, wherein the optimizer additionally takes into account each user group's attributes as part of optimizing one or more HO parameters, each group's attributes comprising any of, or a combination of, the following: priority, traffic type, and equipment capability.

14. The method of claim 11, wherein the optimizer additionally takes into account: a history of base station loads, a history of measured signal qualities, a history of measured signal qualities, a history of observed handover or link failure rates for each UE, a history of other key performance indicators reported by UEs, and a history of used HO parameters.

15. The method of claim 14, wherein the history of measured signal qualities comprises Reference Signal Received Power (RSRP) and Reference Signal Received Quality (RSRQ) values of each UE with respect to their serving base station.

16. The method of claim 11, wherein the one or more HO parameters of all user groups served by the base station are optimized jointly.

17. The method of claim 11, wherein the one or more HO parameters of each group served by the base station is optimized separately.

18. The method of claim 11, wherein only one set of HO parameters are first optimized generally for all groups and, subsequently, adjusting the one set of HO parameters to generate another set of parameters for a given user group, taking into account attributes associated with that given user group.

19. The method of claim 11, wherein one set of HO parameters are optimized by invoking an existing MLB unit of an self-organizing network (SON) module and, subsequently, adjusting the one set of HO parameters to generate another set of parameters for a given user group, taking into account attributes associated with that given user group.

20. An article of manufacture comprising non-transitory computer storage medium storing computer readable program code which, when executed by a processor in a single node, implements a hand over (HO) parameter optimization module implementing mobility load balancing (MLB) by communicating with a radio access network (RAN) controller, the medium comprising:
(a) computer readable program code executed by the processor to implement an interpolator:
receiving associated with at least a base station serving the user equipment (UE) and at least one other base station in the neighborhood of the UE a measurement report comprising: (1) signal strength or signal quality values as measured by an user equipment (UE), (2) other performance indicator values as measured by the UE, and (3) load values associated with reported by the base stations,
identifying one or more time instances that lack measurements of signal strength, signal quality, performance indicator, or load values, and
interpolating values for the identified one or more time instances;
(b) computer readable program code executed by the processor to store, in a storage, the received measurement report and interpolated measurement values; and
(c) computer readable program code executed by the processor to implement an optimizer optimizing one or more HO parameters per user group based on stored measurement reports and interpolated measurement values, wherein a user group is a grouping of UEs.

* * * * *

UNITED STATES PATENT AND TRADEMARK OFFICE
CERTIFICATE OF CORRECTION

PATENT NO. : 9,942,819 B2
APPLICATION NO. : 15/592167
DATED : April 10, 2018
INVENTOR(S) : Mehmet Oguz Sunay and Ali Ozer Ercan It is certified that error appears in the above-identified patent and that said Letters Patent is hereby corrected as shown below:

In the Claims

Claim 1:
Column 12, Line 33, delete "the".
Column 12, Line 34, delete "a".
Column 12, Line 35, delete "report" and insert therefore --reports of measurement values--.
Column 12, Line 36, delete "an user equipment (UE)" and insert --UE--.
Column 12, Line 41, delete "or" and insert --and--.
Column 12, Line 42, after "interpolating" insert --measurement--.

Claim 11:
Column 13, Line 34, delete "the".
Column 13, Line 36, delete "a".
Column 13, Line 36, delete "report" and insert therefore --reports of measurement values--.
Column 13, Lines 37-38, delete "an user equipment (UE)" and insert --UE--.
Column 13, Line 43, delete "or" and insert --and--.
Column 13, Line 44, after "interpolating" insert --measurement--.

Claim 20:
Column 14, Line 42, before "user", delete "the".
Column 14, Line 43, after "UE" insert --,--.
Column 14, Line 43, delete "a".
Column 14, Line 44, delete "report" and insert therefore --reports of measurement values--.
Column 14, Line 45, delete "an user equipment (UE)" and insert --UE--.
Column 14, Line 52, delete "or" and insert --and--.
Column 14, Line 53, after "interpolating" insert --measurement--.

Signed and Sealed this
Sixth Day of November, 2018

Andrei Iancu
*Director of the United States Patent and Trademark Office*